(12) United States Patent
Rathweg

(10) Patent No.: US 6,267,325 B1
(45) Date of Patent: Jul. 31, 2001

(54) TAPE SUPPORT

(75) Inventor: Christopher Rathweg, Lafayette, CO (US)

(73) Assignee: Quantum Corporation, Milpitas, CA (US)

( * ) Notice: Subject to any disclaimer, the term of this patent is extended or adjusted under 35 U.S.C. 154(b) by 0 days.

(21) Appl. No.: 09/311,651

(22) Filed: May 13, 1999

Related U.S. Application Data

(63) Continuation-in-part of application No. 09/276,330, filed on Mar. 25, 1999.

(51) Int. Cl.$^7$ .................................................. B65H 57/14
(52) U.S. Cl. .................................. 242/615.2; 242/332.4; 242/615.3
(58) Field of Search ............................... 242/332.4, 358, 242/615.2, 615.3, 548.2

(56) References Cited

U.S. PATENT DOCUMENTS

| | | | |
|---|---|---|---|
| 2,012,130 | * | 8/1935 | Kellogg ............................ 242/615.3 |
| 3,547,370 | * | 12/1970 | Karl .................................. 242/615.3 |
| 3,850,358 | * | 11/1974 | Nettles .............................. 242/615.3 |
| 4,150,773 | * | 4/1979 | Fell et al. .......................... 242/615.2 |
| 4,403,720 | * | 9/1983 | Grant ................................ 242/615.2 |
| 4,432,508 | * | 2/1984 | Inoue et al. ...................... 242/332.4 |
| 4,441,133 | * | 4/1984 | Ogawa et al. .................... 242/615.2 |
| 4,477,851 | * | 10/1984 | Dalziel et al. ....................... 360/95 |
| 4,646,177 | * | 2/1987 | Sanford et al. ................... 242/332.4 |
| 4,863,116 | * | 9/1989 | Iizuka et al. ..................... 242/615.2 |
| 5,005,748 | * | 4/1991 | Kim .................................. 242/615.2 |
| 5,307,971 | * | 5/1994 | Evans ................................... 242/358 |
| 5,414,585 | * | 5/1995 | Saliba ............................... 242/615.2 |
| 5,447,279 | * | 9/1995 | Janssen et al. ...................... 242/358 |
| 5,501,386 | * | 3/1996 | Kobayashi ....................... 242/615.2 |

FOREIGN PATENT DOCUMENTS

| | | | | |
|---|---|---|---|---|
| 214775 A | * | 4/1961 | (AT) ................................. 242/548.3 |
| 1124254 A | * | 2/1962 | (DE) .................................... 242/358 |

* cited by examiner

Primary Examiner—Emmanuel M. Marcelo
(74) Attorney, Agent, or Firm—Steven G. Roeder

(57) ABSTRACT

A method and device to support a storage tape of a tape drive in the event of a loss of tape tension. Flexible bristles are provided between a tape guide and tape rollers to prevent the storage tape from "falling" below the tape guide and tape rollers and maintaining the storage tape in a position to return between the tape roller flanges when tape tension is regained. In one embodiment, a plurality of flexible bristles are provided along a lower portion of the tape guide. The bristles extend toward a bottom flange of each tape roller in a direction generally perpendicular to the tape path. In another embodiment, the flexible bristles extend radially from the bottom flange of each tape roller. In either embodiment, the bristles are rigid enough to support the storage tape and flexible enough to enable a tape buckle to traverse between the tape guide and tape roller. In addition, the bristles are arranged such that when tape tension is lost, an edge of the storage tape rests on the bristles such that the data area of the storage tape does not contact the bristles. When tape tension is regained, the ramped surface of the bottom flange of each tape roller enables the storage tape to return to a position between the top and bottom flanges of each tape roller.

25 Claims, 3 Drawing Sheets

TAPE SUPPORT

REFERENCE TO RELATED APPLICATION

This application is a Continuation-In-Part of co-pending U.S. application Ser. No. 09/276,330, filed on Mar. 25, 1999 and entitled "BUCKLER FOR A TAPE DRIVE". The contents of U.S. application Ser. No. 09/276,330 is incorporated herein by reference.

FIELD OF THE INVENTION

The present invention relates generally to tape drives for storing data. More specifically, the present invention relates to a tape support for preventing the tape from slipping away from a position between a tape roller and a tape guide.

BACKGROUND

Tape drives are widely used for storing information on storage tape. The storage tape typically is moved between a pair of spaced apart reels, past a transducer head to read from or record data to the tape. In moving between the reels, the storage tape is typically guided by and travels between stationary tape guides and rotatable tape rollers. As illustrated in FIG. 1, during operation, the storage tape 24 is "held" in a position against the tape rollers 31 by a tension caused by the moving tape 24. However, when tension is lost, e.g. during a power loss, the storage tape 24 may no longer be "held" against the tape roller 31 and subsequently may "fall off" the tape rollers and out from between the tape guide 32 and tape rollers 31, as represented by the dashed line in FIG. 1. When this occurs, it is difficult if not impossible for the tape drive to reposition the storage tape against the tape rollers. As a result the tape drive will be disabled and damage to the storage tape may result.

Therefore, there exists a need for a tape drive having a structure that supports the storage tape during a loss of tape tension and maintains the storage tape in a position between the tape guide and the tape rollers so that the storage tape may return to a position between the tape roller flanges when tape tension is regained.

SUMMARY

The present invention is directed to a device and method for supporting a storage tape of a tape drive during a loss of tape tension. The tape support is provided between each tape guide and corresponding tape rollers. In the preferred embodiment, a plurality of bristles are provided on a lower portion of each tape guide, each extending toward a bottom flange of each tape roller. The bristles are attached to the tape guide along a plane such that the bristles lie generally perpendicular to the tape path. When tape tension is lost, the storage tape rests on the longitudinal body of the bristles. As tape tension is regained, the ramped surface of the bottom flange enables the storage tape to return to a position between the top and bottom flanges of each roller. In another embodiment, a plurality of bristles extend radially from the bottom flange of each tape roller. In either embodiment, the bristles are repeatedly flexible without losing rigidity so as to enable a tape buckle to traverse between the tape guide and tape rollers while being able to support the storage tape.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
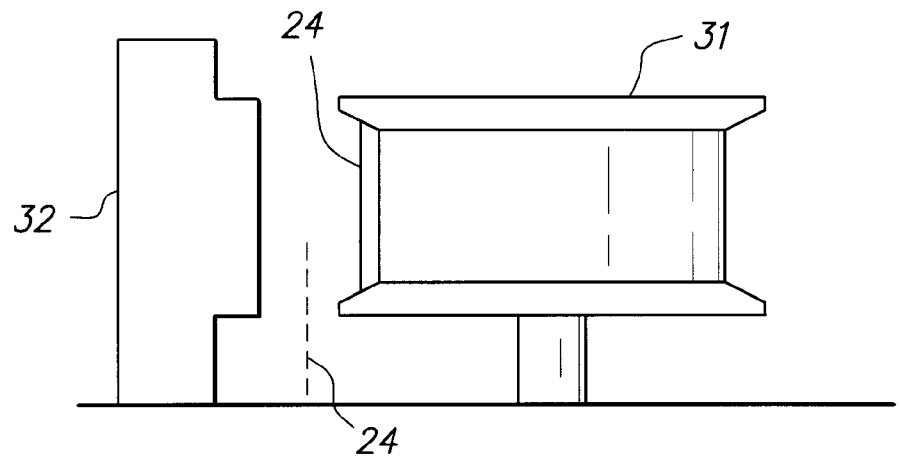
FIG. 1 is a cross-sectional view of a tape drive tape roller and tape guide, illustrating the storage tape held in tension against the tape roller and off of the roller when tension is lost.
Figure 2:
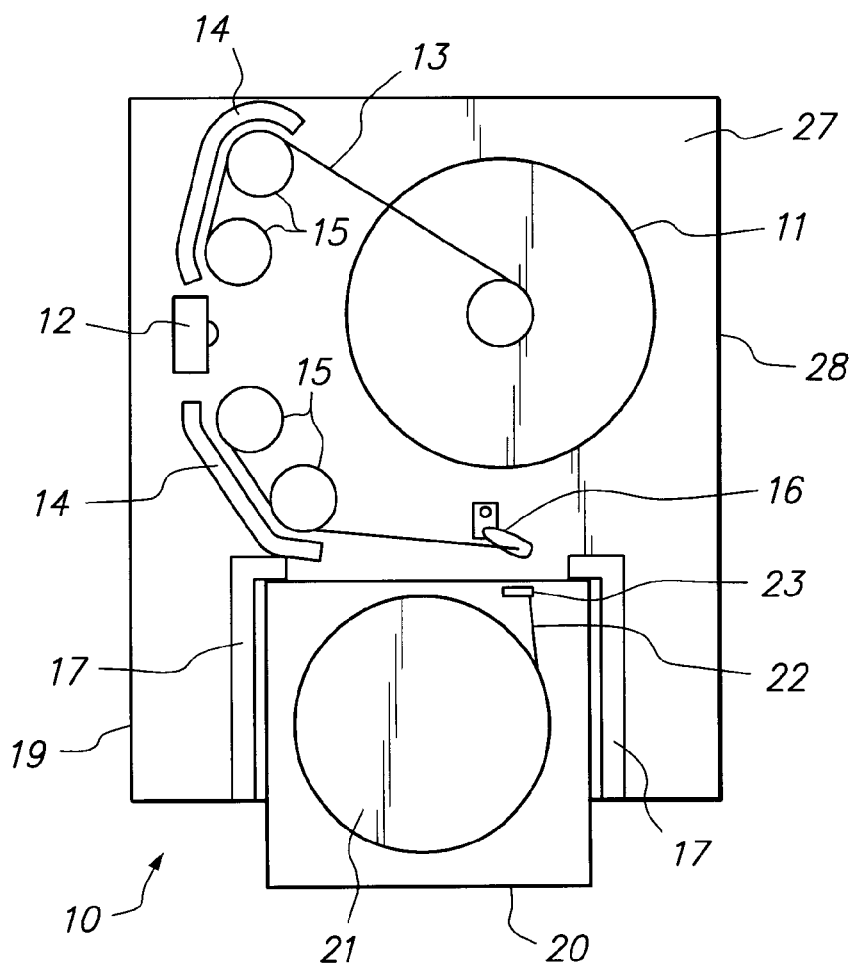
FIG. 2 is a top plan view of a tape drive and a cartridge in a cut away view, having features of the present invention.

Referring initially to FIG. 2, a tape drive 10 having features of the present invention includes a drive housing 19, a data transducer 12, a take-up reel 11, a cartridge receiver 17, and a buckling mechanism 16. The tape drive 10 is designed for use in conjunction with a cartridge 20 including a cartridge reel 21 and a storage tape 24 having a cartridge leader 22. A buckle 23 (illustrated in FIG. 4) secures a take-up leader 13 of the tape drive 10 to the cartridge leader 22. As provided in detail below, the buckling mechanism 16 moves the take-up leader 13 relative to the cartridge leader 22 to automatically couple and uncouple the buckle 23 to attach the take-up leader 13 to the cartridge leader 22.

Figure 3:
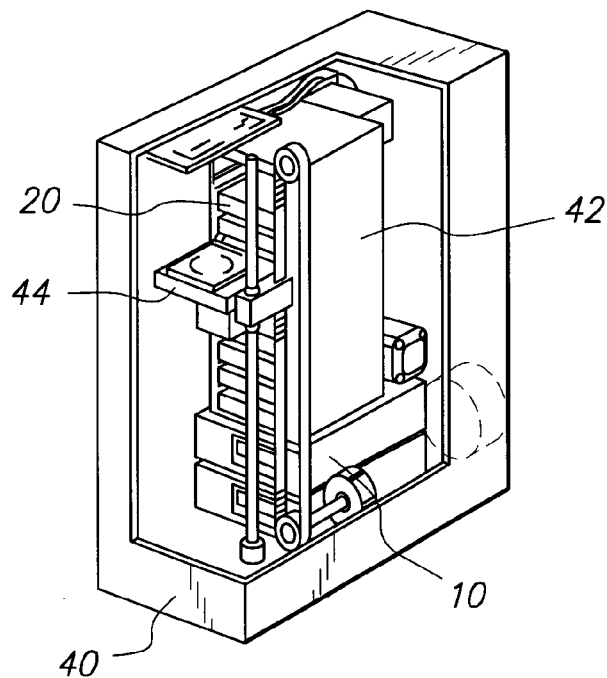
FIG. 3 is a perspective, partly cut away view of a tape library having features of the present invention.

The tape drive 10 is typically installed within a computer (not shown), or a word processor (not shown). Alternately, the tape drive 10 can be utilized as part of a tape library 40. In the embodiment illustrated in FIG. 3, the tape library 40 includes a plurality of cartridges 20 which are retained in a multiple cartridge magazine 42, a robotic cartridge handler 44 and a pair of tape drives 10. The robotic cartridge handler 44 selectively retrieves one of the cartridges 20 from the cartridge magazine 42 and places the cartridge 20 within one of the tape drives 10. A suitable tape library 40 is sold under the trademark DLTstor™, by Quantum Corporation.

A detailed description of the various components of a tape drive 10 is provided in U.S. Pat. No. 5,371,638, issued to Saliba, and assigned to Quantum Corporation, the Assignee of the present invention. The contents of U.S. Pat. No. 5,371,638 are incorporated herein by reference. Accordingly, only the structural aspects of the tape drive 10 which are particularly significant to the present invention are provided herein. A representative tape drive 10 is sold by Quantum Corporation, the Assignee of the present invention under the trademark DLT™4000.

The drive housing 19 retains the various components of the tape drive 10. The drive housing 19, illustrated in FIG. 2, includes a base, four spaced apart side walls 28 and a cover (not illustrated in FIG. 2 for clarity). The tape drive 10 includes a plurality of tape rollers 15 and tape guides 14 for guiding the storage tape 24 through a tape path, past the data transducer 12 and onto the take-up reel 11. In the present embodiment, the tape drive 10 is shown preferably with four tape rollers 15 and two tape guides 14. However, the tape drive 10 may also be provided with different number of rollers 15 and tape guides 14.

The storage tape 24 stores data in a form that can be subsequently retrieved if necessary. A magnetic storage tape 24 is commonly used to store data in digital form. For conservation of space, the storage tape 24 has a tape width of preferably at least approximately one-half an inch (0.5 in). Alternately, for example, the storage tape 24 can have a tape width of between approximately four millimeters to eight millimeters (4.0 mm–8.0 mm). The storage tape 24 includes a storage surface on one side of the storage tape 24 for storing data. The storage surface is divided into a plurality of tracks (not shown). Each track can be a linear pattern which extends the length of the storage tape 24. Alternately, for example, the data can be recorded in diagonal strips across the storage tape 24. The storage tape 24 is initially retained on the cartridge reel 21 of the cartridge 20.

Figure 4:
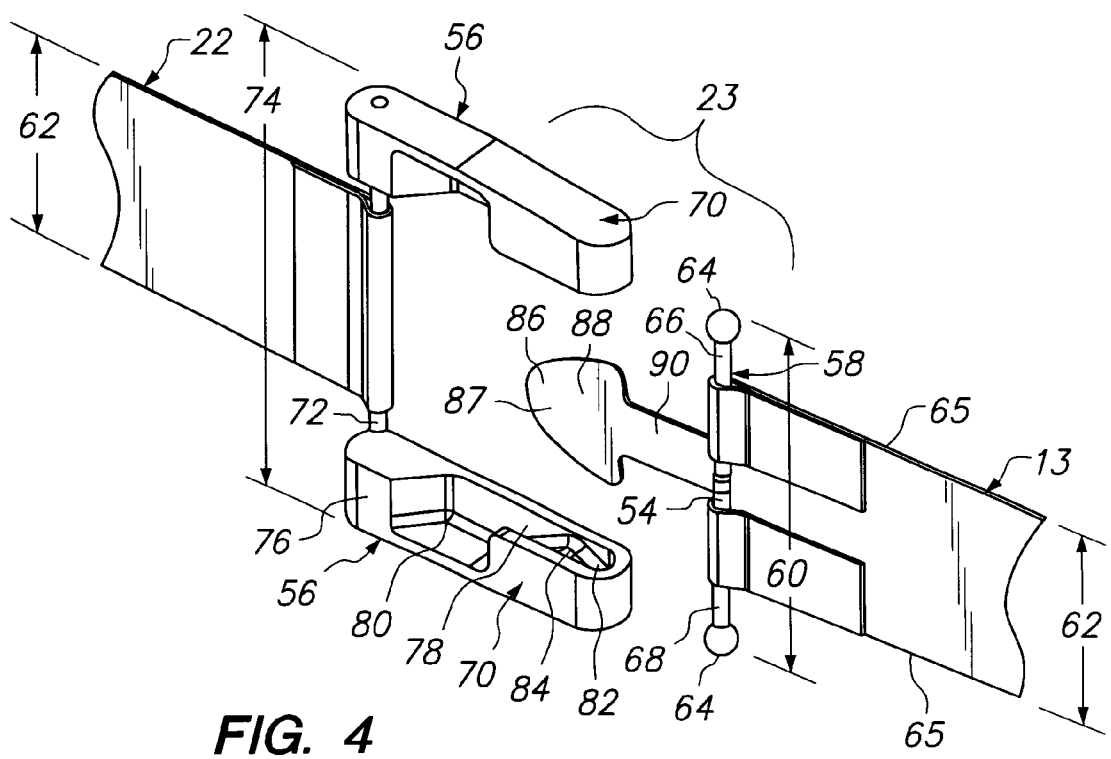
FIG. 4 is a magnified, perspective view of the buckle shown in FIG. 2.

The buckle 23 secures the take-up leader 13 of the tape drive 10 to the cartridge leader 22 of the cartridge 20. As shown in FIG. 4, the buckle 23 includes a first buckle component 54 attached to the take-up leader 13 and a second buckle component 56 attached to the cartridge leader 22. The buckle 23 reliably and securely couples the cartridge leader 22 to the take-up leader 13. This reduces the likelihood of leader runaway. Further, as provided herein, the buckle 23 is made of durable materials to increase the operational life of the buckle 23.

The first buckle component 54 includes a bar-shaped, buckle bar 58 which is secured to the take-up leader 13. In the embodiment illustrated, the buckle bar 58 is a substantially straight piece of a rigid material, having a substantially circular cross section. The buckle bar 58 extends transversely across the take-up leader 13. The buckle bar 58 preferably has a bar length 60 which is greater than a leader width 62 of the take-up leader 13. Because the bar length 60 is greater than the leader width 62, the buckle bar 58 has a pair of bar ends 64 which cantilever past opposed edges 65 of the take-up leader 13. Stated another way, the buckle bar 58 includes a first bar section 66 which extends away from one of the leader edges 65 and a second bar section 68 which extends away from the other leader edge 65 of the take-up leader 13.

The second buckle component 56 includes a pair of spaced apart bar receivers 70. Each bar receiver 70 is sized and shaped to receive a portion of one of the bar sections 66, 68 to couple the take-up leader 13 to the cartridge leader 22. The use of two spaced apart bar receivers 70 ensures a reliable connection between the leaders 13, 22.

As best be seen with reference to FIG. 4, each of the bar ends 64 of the buckle bar 58 is spherical shaped. Further, in this embodiment, the bar receivers 70 are secured together with a connector bar 72, which is attached to the cartridge leader 22. In this embodiment, the bar receivers 70 are spaced apart a receiver distance 74 by the connector bar 72.

Preferably, the receiver distance 74 is longer than the leader width 62. This allows the bar receivers 70 to engage a cartridge stop (not shown) in the cartridge 20 to inhibit the cartridge leader 22 from being pulled back into the cartridge 20. Further, this keeps the buckle 23 away from the cartridge reel 21 and out of the path of the storage tape 24 to protect the storage tape 24.

Each bar receiver 70 is sized and shaped to receive one of the bar ends 64. Each bar receiver 70 is defined by a substantially rectangular receiver housing 76. Each receiver housing 76 includes a channel 78 having a channel opening 80 and a channel end 82. During coupling, the buckle bar 58 is inserted into the channel opening 80. Subsequently, the buckle bar 58 is forced to slide in the channel 78 until the buckle bar 58 reaches the channel end 82.

Preferably, each channel 78 includes a bump 84 which projects into the channel 78 near the channel end 82. The bump 84 reliably holds the buckle bar 58 against the channel end 82. Preferably, each bump 84 is ramped shaped to facilitate movement over the bump 84. Alternately, for example, each bump 84 could be semi-circular shaped.

Each channel 78 is wide enough to receive the buckle bar 58. Further, the channels 78 are spaced apart so that a bottom of each channel 78 substantially contacts the bar ends 64 of the buckle bar 58 when the buckle bar 58 is placed in the channels 78.

A number of alternate embodiments of the buckle 23 are illustrated in co-pending and commonly assigned U.S. Pat. No. 6,092,754 as referred to and incorporated herein above. In addition, the take-up leader 13 and cartridge leader 22 may be buckled using the conventional hoop and mushroom tab arrangement as described in commonly assigned U.S. Pat. Nos. 4,662,049 and 4,720,913. Each embodiment is also applicable with the present invention.

Figure 5:
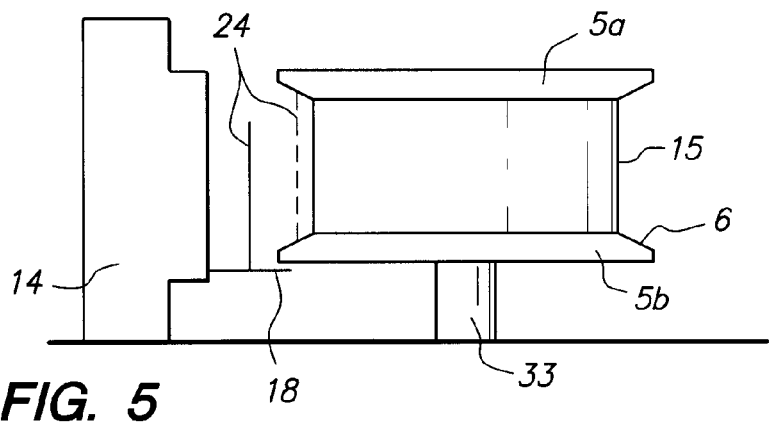
FIG. 5 is a cross-sectional view of a tape support extending from the tape guide, illustrating the storage tape being supported by the tape support.

The present invention is illustrated in FIG. 5, wherein a tape support 18 is provided between the tape guide 14 and the tape roller 15. As shown, the tape support extends from a lower portion of the tape guide 14, towards the lower flange 5b of the tape roller 15. When tape tension is lost, e.g. during a loss of power, the tape support 18 prevents the storage tape 24 from "falling" into the area below the tape guide 14 and tape roller 15 and maintains the storage tape 24 in the position shown in FIG. 5, i.e. within the tape path. As tape tension is regained, the ramped surface 6 of bottom flange 5b enables the storage tape 24 to return to the position shown by the dashed line i.e. between the top flange 5a and bottom flange 5b.

Figure 6:
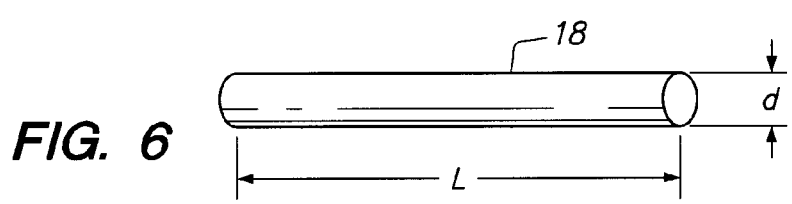
FIG. 6 is a perspective view of a bristle in accordance with principles of the present invention.

Preferably, the tape support 18 is made up of a plurality of bristles 18, an example of which is shown in FIG. 6. Each bristle 18 is preferably made of a synthetic fiber material. As shown, each bristle 18 has a cylindrical body having a longitudinal length L of approximately 6.35 mm and a diameter d of approximately 0.064 mm. The bristles 18 may be attached to the tape guide 14 in a number of ways. For example, each bristle 18 may be inserted into pre-drilled holes along the lower portion of each tape guide and secured therein with an adhesive. The bristles 18 are preferably fixed along a plane that is generally perpendicular to the direction of storage tape 24 travel. Since the bristles generally extend perpendicular to the storage tape 24, at a location below the tape path, the data area of the storage tape 24 avoids contact with the bristles 18, thereby avoiding any possible damage to the data area. In the event that tape tension is lost, the storage tape 24 may "slip" away from the position shown in FIG. 5 as a dashed line, i.e. between the top and bottom flanges 5a and 5b, respectively, of tape roller 15. Instead of "falling" below the tape guide 14 and tape roller 15, the storage tape 24 rests on the longitudinal body of the bristles 18.

Figure 7:
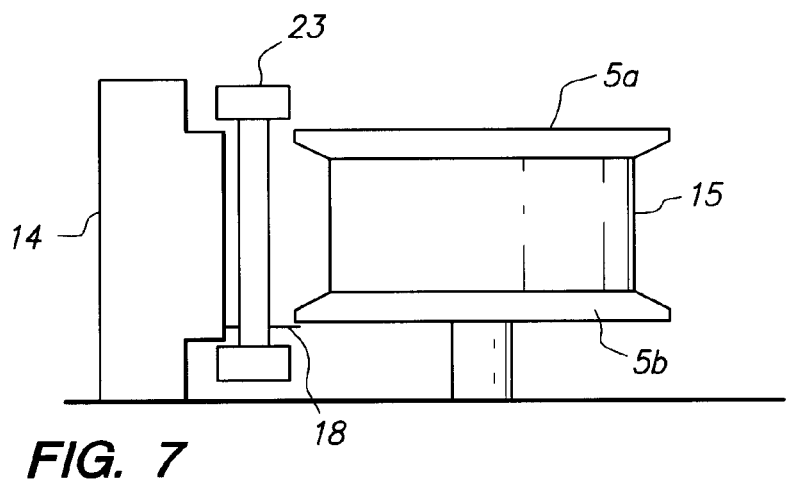
FIG. 7 is a cross-sectional view of how the present invention enables the use of the buckle of FIG. 4.

Each bristle 18 is flexible enough to enable the buckle 23 to traverse through the tape path, between the tape guide 14 and the tape rollers 15. As illustrated in FIG. 7, the bristles 18 are flexed by the buckle 23 as the buckle 23 traverses between the tape guide 14 and the tape roller 15. Once the buckle 23 exits the area between the tape guide 14 and tape roller 15, the bristles 18 return to an unflexed state. Thus, the bristles 18 have sufficient strength to withstand repeated flexing and bending by the buckle 23 throughout the life of the tape drive 10 without losing rigidity to support the storage tape 24. Preferably the tape guide 14 and tape roller 15 are positioned to leave a nominal gap therein between of approximately 1.8 mm, enabling the buckle 23 to traverse therein between.

Figure 8:
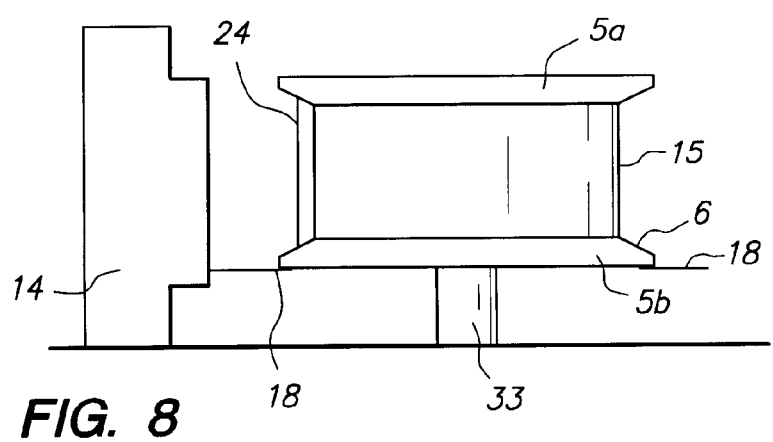
FIG. 8 is a cross-sectional view of an alternative embodiment of the present invention.

Alternatively, the bristles 18 may be attached to the bottom flange 5b of each tape roller 15, as shown in FIG. 8. In this embodiment, a plurality of bristles 18 extend radially from the periphery of the bottom flange 5b and rotate in unison with the tape roller 15. As with the preferred embodiment shown in FIG. 5, the bristles 18 have sufficient rigidity to support the storage tape 24, if tape tension is lost, while being flexible enough to enable the buckle 23 to repeatedly traverse between the tape guide 14 and tape rollers 15. The bristles 18 may be attached to the bottom flange 5b on the bottom surface with a suitable adhesive, as shown in FIG. 8. Alternatively, the bristles 18 may be molded into a disk of approximately the same diameter as that of the bottom flange 5b, and attached to the bottom surface of each tape roller 15 with a suitable adhesive or fasteners.

While the particular tape drive 10 as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A tape drive comprising:
   a take-up reel;
   a cartridge receiver that receives a cartridge, the cartridge including a cartridge reel, a cartridge leader and a storage tape wound about the cartridge reel;
   a plurality of tape rollers positioned to define a tape path around which the storage tape is transferred between the cartridge reel and the take-up reel;
   at least one tape guide positioned in close proximity to the tape rollers such that the storage tape traverses therein between; and
   a tape support that maintains the storage tape between the tape guide and the tape rollers, the tape support being integral with each tape roller, the tape support comprising a plurality of bristles extending from each tape roller.

2. The tape drive of claim 1 wherein the plurality of bristles extend radially from a periphery of a lower flange of each tape roller.

3. The tape drive of claim 1 wherein the take-up reel includes a take-up leader, the take-up leader being adapted to couple to the cartridge leader.

4. The tape drive of claim 3 further comprising a buckle that couples the take-up leader to the cartridge leader.

5. The tape drive of claim 4 wherein the bristles are bendable as the buckle travels between the tape guide and the tape rollers.

6. A tape library including the tape drive of claim 1.

7. In a tape drive wherein a data storage tape is transferred between a take up reel and a cartridge reel of a removable cartridge, a method of maintaining the data storage tape between at least one tape guide and a plurality of tape rollers comprising the steps of:
   positioning the at least one tape guide in relative close proximity to the tape rollers;
   providing a tape support between the at least one tape guide and the tape rollers, the tape support including a plurality of bristles on each tape roller; and
   resting an edge of the storage tape against the tape support when the storage tape loses tape tension such that the storage tape remains positioned between the at least one tape guide and the tape rollers.

8. The method of claim 7 further comprising the step of positioning the at least one tape guide at a distance from the tape rollers such that a buckle adapted for coupling a tape leader to a cartridge leader may traverse therein between.

9. The method of claim 8 wherein the tape support accommodates the traversing of the buckle between the at least one tape guide and the tape rollers.

10. The method of claim 7 wherein the plurality of bristles extend radially from a bottom flange of each tape roller.

11. A tape drive adapted for use with a cartridge, the cartridge including a cartridge reel, a cartridge leader and a storage tape, the tape drive comprising:
    a take-up reel;
    a cartridge receiver that receives the cartridge;
    a tape roller positioned to define a tape path around which the storage tape is transferred between the cartridge reel and the take-up reel;
    a tape guide positioned in close proximity to the tape roller such that the storage tape traverses therein between; and
    a tape support that maintains the storage tape between the tape guide and the tape roller, the tape support including a bristle that extends away from the tape roller.

12. The tape drive of claim 11 wherein the tape support comprises a plurality of bristles that extends from the tape roller.

13. The tape drive of claim 12 wherein the plurality of bristles extend substantially radially from a bottom of the tape roller.

14. The tape drive of claim 11 wherein the take-up reel includes a take-up leader, the take-up leader being adapted to couple to the cartridge leader, the tape drive further comprises a buckle that couples the take-up leader to the cartridge leader and wherein the bristle is bendable as the buckle travels between the tape guide and the tape roller.

15. A tape library including the tape drive of claim 11.

16. A method for supporting a storage tape between a tape guide and a rotatable tape roller of a tape drive, the method comprising the step of securing a bristle to the tape roller, the bristle supporting the storage tape between the tape guide and the tape roller.

17. The method of claim 16 including the step of securing a plurality of spaced apart bristles to the tape roller, the bristles extending substantially radially from the tape roller.

18. The method of claim 16 including the step of securing the bristle to a bottom flange of the tape roller.

19. The method of claim 16 wherein the bristle is flexible to accommodate the traversing of a buckle between the tape guide and the tape roller.

20. The method of claim 16 further comprising the step of securing a plurality of bristles to the tape roller, each bristle extending substantially radially from a bottom flange of the tape roller.

21. A tape drive adapted for use with a cartridge, the cartridge including a cartridge reel, a cartridge leader and a storage tape, the tape drive comprising:
    a take-up reel;
    a cartridge receiver that receives the cartridge;
    a tape roller positioned to define a tape path around which the storage tape is transferred between the cartridge reel and the take-up reel, the tape roller including a bottom;
    a tape guide positioned in close proximity to the tape roller such that the storage tape traverses therein between; and a tape support that maintains the storage tape between the tape guide and the tape roller, the tape support including a bristle that extends away from the tape guide towards the bottom of the tape roller, the bristle including a longitudinal body; wherein, when tape tension is lost, the storage tape rests on the longitudinal body of the bristle.

22. The tape drive of claim 21 wherein the bristle extends below the bottom of the tape roller.

23. The tape drive of claim 21 wherein the bristle extends from a lower portion of the tape guide towards a lower flange of the tape roller.

24. The tape drive of claim 21 wherein the bristle is bendable as a buckle travels between the tape guide and the tape roller.

25. A tape library including the tape drive of claim 21.

* * * * *